United States Patent [19]

Engelsmann et al.

[11] 4,451,011
[45] May 29, 1984

[54] FILM WINDING SPOOL FOR PHOTOGRAPHIC CAMERA

[75] Inventors: Dieter Engelsmann, Unterhaching; Leo Lippl, Munich; Reinhard Nicko; Peter Stiefel, both of Munich; Peter Lermann, Naring, all of Fed. Rep. of Germany

[73] Assignee: Agfa-Gevaert Aktiengesellschaft, Leverkusen, Fed. Rep. of Germany

[21] Appl. No.: 376,825

[22] Filed: May 10, 1982

[30] Foreign Application Priority Data

May 21, 1981 [DE] Fed. Rep. of Germany ....... 3120268

[51] Int. Cl.³ .......................... G03B 1/04; B65H 75/28
[52] U.S. Cl. .......................................... 242/71; 242/74
[58] Field of Search ....................... 242/71, 71.1, 71.2, 242/74, 74.1

[56] References Cited

U.S. PATENT DOCUMENTS

| | | | |
|---|---|---|---|
| 2,487,479 | 11/1949 | Roehrl | 242/71.1 |
| 2,690,883 | 10/1954 | Barker et al. | 242/71 |
| 3,383,068 | 5/1968 | Winkler et al. | 242/71.1 X |
| 3,567,147 | 3/1971 | Engelsmann et al. | 242/71.1 |
| 3,885,750 | 5/1975 | Ikeuchi | 242/74 |
| 4,274,726 | 6/1981 | Yoneyama et al. | 242/71.1 X |

FOREIGN PATENT DOCUMENTS 154977  11/1938  Austria ............... 242/74.1

Primary Examiner—John Petrakes
Attorney, Agent, or Firm—Michael J. Striker

[57] ABSTRACT

A film winding spool for a photographic camera has an inner cylindrical member driven in rotation and provided with engaging formations for engaging an initial portion of the film, and an outer cylindrical member surrounding the inner member so as to form a space therebetween and having a slot for introducing the initial portion of a film into this space and an outer surface for winding successive coils of the film, wherein the outer member has at least one opening arranged so that a piece of the film separated from a remaining part of the film can be withdrawn from the space between the inner and outer members through the opening.

8 Claims, 2 Drawing Figures

FILM WINDING SPOOL FOR PHOTOGRAPHIC CAMERA

BACKGROUND OF THE INVENTION

The present invention relates to a film winding spool for a photographic camera with an automatic film threading device.

Film winding spools of the above-mentioned general type are known in the art. One of such spools is disclosed, for example, in the German Pat. No. 1,245,712. A film winding spool described in this patent has an automatic film threading device which includes an inner cylinder driven in rotation and provided with means for engaging an initial portion of a film, and an outer cylinder provided with a slot for introduction the initial portion of the film and serving as a winding sleeve. The above-described film winding spool possesses some disadvantages in the sense of removal of film pieces which are torn-off and remain engaged in a space between the inner and outer cylinders, and also in the sense of a reliable engagement of the initial portion of the film.

SUMMARY OF THE INVENTION

Accordingly, it is an object of the present invention to provide a film winding spool which avoids the disadvantages of the prior art.

More particularly, it is an object of the present invention to provide a film winding spool which makes possible easy removal of film pieces which have been torn-off and engaged in the space between the inner and outer cylinders, and also provides for a reliable engagement of the initial portion of the film.

In keeping with these objects and with others which will become apparent hereinafter, one feature of the present invention resides, briefly states, in a film winding spool for a photographic camera, having an inner cylindrical member with film engaging means and an outer cylindrical member surrounding the inner member with formation of a space therebetween, wherein the outer member is provided with one or a plurality of openings arranged so that a piece of the film separated from a remaining part of the film can be withdrawn from the space between the inner and outer members through the opening or openings.

In accordance with another feature of the present invention the openings extend in longitudinal and circumferential directions of the outer member and are distributed over the outer surface of the latter.

Still another feature of the present invention resides in the fact that the engaging means includes a plurality of projections provided on the inner member and having a flank facing in direction of rotation of the latter, and the projections are offset relative to one another in axial and circumferential directions and arranged in a region associated with the film perforations even in the event of inclined introduction of the initial portion of the film in the slot of the outer member.

A further feature of the present invention is that a stop is arranged on the inner surface of the outer member so that the initial portion of the film abuts against the stop and rotates the outer member upon this abutment.

Still a further feature of the present invention is a spring-biased turnable flap which urges the initial portion of the film toward the slot of the outer member and to the space between the inner and outer members, and a pressing roller arranged on the flap and pressing the initial portion of the film toward the engaging projections of the inner member.

An additional portion of the invention is that the roller has an axle with an extension engageable in an arresting groove so that upon removal of the film the outer member is arrested in a position ready for introduction of the initial portion of another film.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
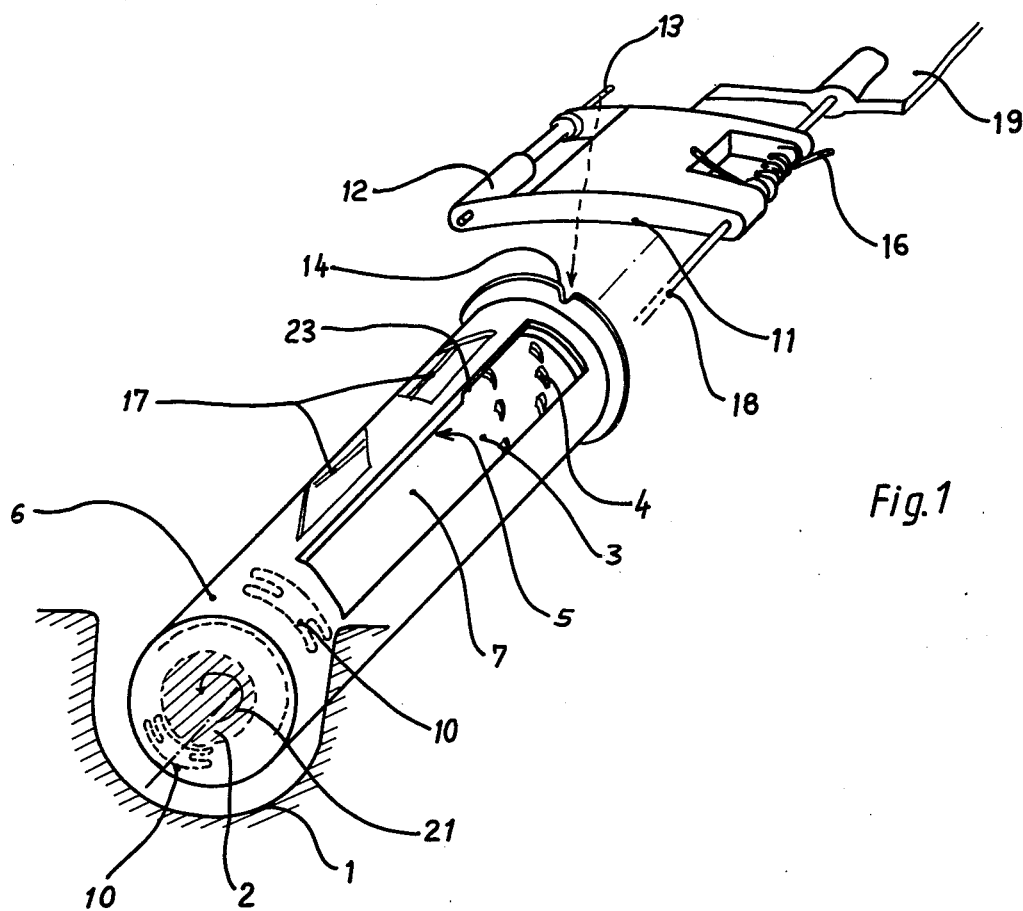
FIG. 1 is a perspective view of a film winding spool in accordance with the present invention.
Figure 2:
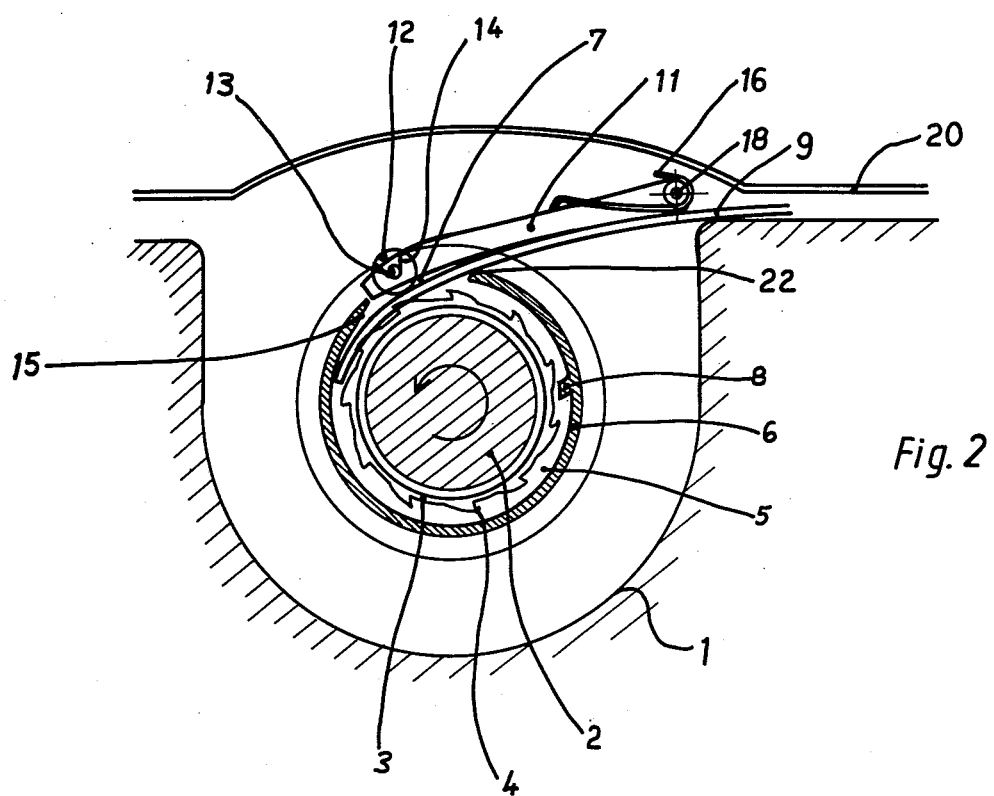
FIG. 2 is a view showing a section taken normal to the axis of the film winding spool, and also associated camera elements.

A film winding spool in accordance with the present invention is identified in toto by reference numeral 2 and arranged in a respectively formed, advantageously molded, chamber in a housing 1 of a photographic camera. The film spool 2 is provided with means for threading and winding of a film 9, as will be explained hereinbelow.

The film winding spool 2 includes an inner catching spool 3 with catching means 4, and a outer sleeve radially outwardly spaced from the spool 3 so as to form a free space therebetween. The outer or winding sleeve 6 has a slot 7. An initial portion 9 of the film is automatically introduced into the space 5 between the catching spool 3 and the winding sleeve 6 through the slot 7 in the latter.

The catching spool 3 and the winding sleeve 6 are coupled with one another by friction means 10 formed by springs, so that they can be overturned relative to one another against a resistance. For threading the initial portion of the film 9, the film must be pushed under a flap 11 serving as a guiding element near a film gate. Thereby, the initial portion of the film is automatically inserted into the slot 7 and then introduced into the space 5 between the spool 3 and sleeve 6.

The above-mentioned catching or engaging means include a plurality of catching teeth 4 or hooks provided on the outer surface of the catching spool 3 and distributed angularly and axially. They can be formed of one piece with the spool 3. The catching teeth or hooks are arranged so that even in the event of inclined introduction of the initial portion of the film, a perforation of the film will reliably reach one of the catching teeth. The flap 11 provided with a pressing roller 12 guides the initial portion of the film toward the catching teeth 4.

During rotation of the driven catching spool 3 via a manual or motor driven transmission, the catching teeth 4 engage in one or more perforation openings of the film 9. The catching spool 3 pulls the film 9 until it abuts against a stop 8 provided at the inner side of the outer sleeve 6. As a result of this, the outer sleeve 6 is also driven in rotation by the thus-obtained form-locking connection. During winding of the thus-engaged film on the winding sleeve 6, the film lifts the flap 11 so that the arresting force is considerably reduced and the rotation of the outer sleeve 6 is mechanically facilitated. Further film coils are formed on the outer surface of the winding sleeve 6 inside a chamber provided for this in the housing 1 of the camera.

During return winding of the film, the film is first removed from the outer sleeve 6, until with the last coil on the outer sleeve 6, an axial piece 13 of the pressing roller 12 falls into an arresting groove 14 on a flange 15 of the outer sleeve 6 and thereby stops the latter. Friction springs 10 which are advantageously arranged in pairs symmetrical relative to one another are designed so that the catching spool can rotate further, and the film 9 is automatically released from the catching hooks 4 and can be simply withdrawn. Therefore, positive coordination takes place between the slot 7 of the outer sleeve 6 and the arresting means 13, 14 of the same. As a result of this, during action of the friction spring 10 in the event of running without a film, a suitable initial position for a new threading is automatically adjusted and retained.

The outer sleeve 6 is provided with openings 17. In the event if a perforation opening is torn-off and small piece or chip of the film is formed and retained in the inner space 5 between the inner spool and the outer sleeve and can block the operation, this piece or chip can be withdrawn from the inner space 5 through the openings 17. The openings 17 are slot-shaped and arranged inclined, so that during threading of the initial portion 9 of the film, snagging or jamming of the film is prevented. These openings are small as compared with the axial length and the circumference of the spool.

The flap 11 which services as a guiding element is supported on an axle 18. The axle 18 is mounted, in turn, on a plate 19 which serves as a light cover in the housing 1 of the camera. The plate 19 is located under a camera rear cover 20. The flap 11 can be lifted for removal of the film pieces.

It will be understood that each of the elements described above, or two or more together, may also find a useful application in other types of constructions differing from the types described above.

While the invention has been illustrated and described as embodied in a film winding spool for a photographic camera, it ia not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A film winding spool for a photographic camera, comprising an inner substantially cylindrical member which is driven in rotation; means on said inner member engaging an initial portion of a film; and an outer substantially cylindrical member substantially completely surrounding said inner member so as to form a space therebetween and having an outer surface for winding successive coils of the film; means for allowing introduction of the initial portion of a film into said space and including a slot provided at a predetermined location of said outer surface of said outer member and having a predetermined dimension; and means for allowing withdrawal of pieces of the film, separated from a remaining part of the film from said space between said inner and outer members, said withdrawal means including a plurality of openings unsuitable for initial-film-portion introduction, each arranged at a location spaced from the location of said slot and having a dimension smaller than the dimension of the latter, each of said openings extending in a longitudinal direction and in a circumferential direction of said outer member, and said openings being distributed over said outer surface of said outer member.

2. A film winding spool as defined in claim 1, wherein said inner member is rotatable in a predetermined direction about an axis, said engaging means including a plurality of projections provided on said inner member and each having a flank facing in direction of rotation of said inner member, said projections being offset relative to one another in an axial direction and in a circumferential direction of said inner member and arranged in a region associated with film perforations even in the event of inclined introduction of the initial portion of the film into said slot.

3. A film winding spool as defined in claim 1; and further comprising friction means for coupling said outer member with said inner member, and arresting means for positioning said outer member relative to a camera chamber for fixing and removing the initial portion of the film.

4. A film winding spool as defined in claim 1; and further comprising means for transmitting rotation from said inner member to said outer member and including a stop arranged on said outer member inside the latter and cooperating with the initial portion of the film.

5. A film winding spool as defined in claim 1; and further comprising means for urging the initial portion of the film toward said slot and said space between said inner and outer members, and means for pressing the initial portion of the film toward said engaging means.

6. A film winding spool as defined in claim 5, wherein said urging means uncludes a spring-biased turnable flap, and said pressing means including a pressing roller arranged on said flap.

7. A film winding spool as defined in claim 6, wherein said pressing roller is arranged so that it is lifted during introduction of the initial portion of the film.

8. A film winding spool for a photographic camera, comprising an inner substantially cylindrical member which is driven in rotation; means on said inner member engaging an initial portion of a film; an outer substantially cylindrical member surrounding said inner member so as to form a space therebetween and having a slot for introducing the initial portion of a film into said space and an outer surface for winding successive coils of the film, said outer member also having at least one opening arranged so that a piece of the film, separated from a remaining part of the film can be withdrawn from said space between said inner and outer members through said opening; means for urging the initial portion of the film toward said slot and said space between said inner and outer members and including a spring-biased turnable flap; means for pressing the initial portion of the film toward said engaging means and including a pressing roller arranged on said flap and having an axle; and means for arresting said outer member relative to a camera chamber, said arresting means including an arresting groove on said outer member and an extension of said axle, engageable in said arresting groove, arranged so that upon removing the film said outer member is arrested in a position ready for introducing an initial portion of another film.

* * * * *